No. 775,224. PATENTED NOV. 15, 1904.
J. B. MOTT.
AUTOMOBILE ATTACHMENT.
APPLICATION FILED AUG. 5, 1904.
NO MODEL.

WITNESSES:
L. Almquist
Isaac B. Owens

INVENTOR
James B. Mott
BY
Munn
ATTORNEYS

No. 775,224.	Patented November 15, 1904.

UNITED STATES PATENT OFFICE.

JAMES B. MOTT, OF FREDONIA, NEW YORK.

AUTOMOBILE ATTACHMENT.

SPECIFICATION forming part of Letters Patent No. 775,224, dated November 15, 1904.

Application filed August 5, 1904. Serial No. 219,631. (No model.)

*To all whom it may concern:*

Be it known that I, JAMES B. MOTT, a citizen of the United States, and a resident of Fredonia, in the county of Chautauqua and State of New York, have invented a new and Improved Automobile Attachment, of which the following is a full, clear, and exact description.

The invention relates to an attachment for automobile-decks adapted to be placed in position when the tonneau or rear seat of the machine is removed.

By means of my invention a storage-chamber of greatly-increased area is provided and the appearance of the vehicle is materially improved.

Reference is to be had to the accompanying drawings, forming a part of this specification, in which similar characters of reference indicate corresponding parts in all the figures.

Figure 1:
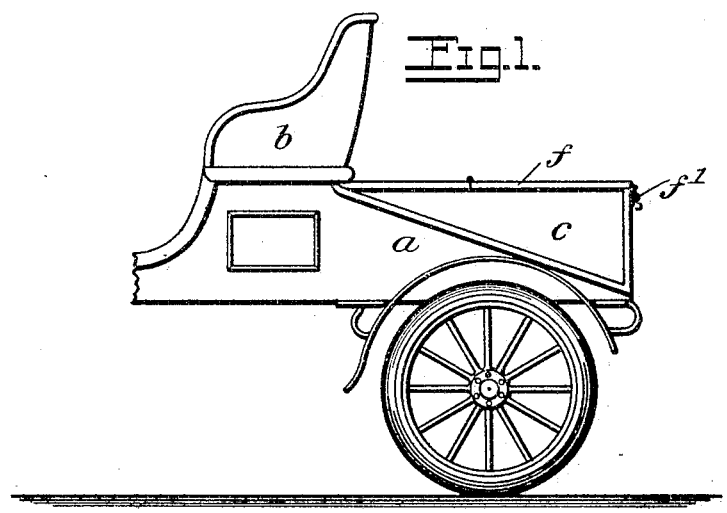
Figure 2:
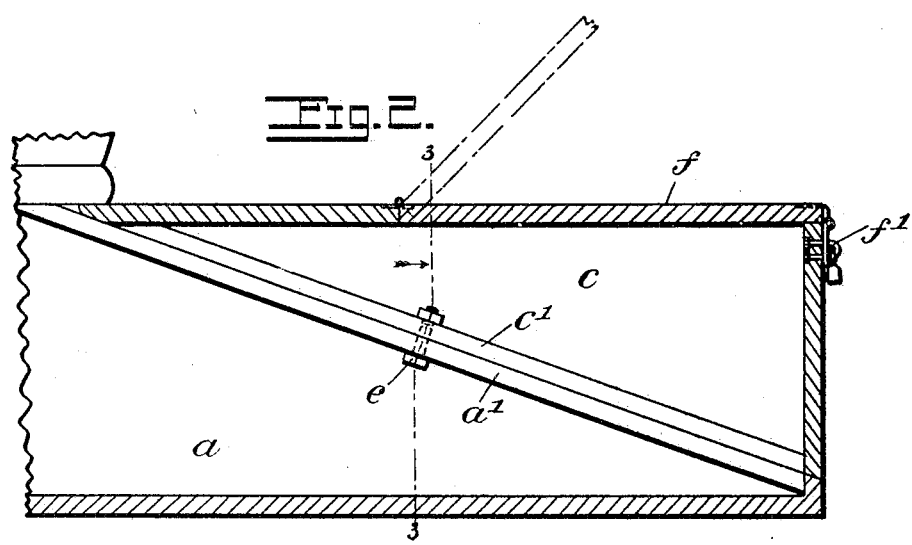
Figure 3:
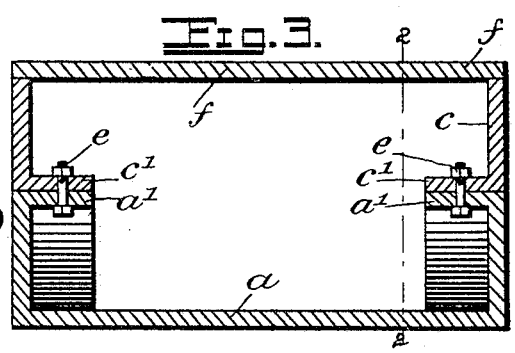

Figure 1 is a side elevation of the rear part of a motor-vehicle equipped with my improvement. Fig. 2 is an enlarged longitudinal section of the same, and Fig. 3 is a cross-section on the line 3 3 of Fig. 2.

Ordinarily motor-vehicles are provided with a rear deck portion $a$, sloping downward from the front seat $b$, and in case of double-seated or tonneau vehicles the rear seat is removably placed on the deck portion $a$, so that the vehicle may be converted into a single or double seated arrangement, as desired.

My invention consists in the application of an essentially triangular-shaped deck-section $c$, secured to the stationary rear deck portion $a$ in any desired manner, preferably by means of flanges $c'$ and $a'$, respectively, on the sections $c$ and $a$, and fastening-bolts $e$, extending through the flanges. The removable deck-section $c$ has a hinged lid or closure $f$ provided with any suitable locking device $f'$. This deck-section $c$ may be placed in or removed from the machine whenever desired, and when in place it greatly improves the appearance of the single-seated machine and furnishes in addition a much larger storage-chamber. By lifting the lid $f$ the interior of the chamber may be reached and the fastenings $e$ placed in or removed from position, thus securing or permitting the removal of the deck-section $c$ whenever desired. The invention may be applied to automobiles having rear decks of various shapes.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. An automobile provided with a rear deck-section, means for removably securing the same in place, the deck-section being adapted to engage the stationary rear deck portion of the automobile and said deck-section having a closure, and means for removably holding the same in active position.

2. An automobile having a rear deck-section inclining downward from the front seat, and an essentially triangular deck-section removably mounted thereon, forming therewith an essentially square rear deck.

3. An automobile having a rear deck-section inclining downward from the front seat, an essentially triangular deck-section removably mounted thereon, forming therewith an essentially square rear deck, the said deck-section having inwardly-extending engaging flanges, and fastening devices extending through the flanges for the purpose specified.

4. An automobile having a rear deck-section inclining downward from the front seat, an essentially triangular deck-section removably mounted thereon, forming therewith an essentially square rear deck, and a hinged lid mounted on the removable deck-section and provided with means for removably holding it in closed position.

5. An automobile having a stationary rear deck-section inclining downward from the front seat, said rear deck-section having inwardly-projecting flanges and an essentially triangular removable deck-section also having flanges and adapted to rest on the said rear deck-section of the automobile, the said flanges lying opposite each other, a fastening device passing through the flanges to hold the removable deck-section in place, a hinged lid covering an opening in said removable deck-section, and a releasable fastening for the lid.

6. The combination with a stationary rear deck portion of an automobile, said portion having an inwardly-extended flange, of a rear deck-section removably engaged with said stationary rear portion and having an inwardly-extending flange matching with the flange thereof, and a fastening device engaged with said flanges for the purpose specified.

7. The combination with a stationary rear deck portion of an automobile, said portion having an inwardly-extended flange, of a rear deck-section removably engaged with said stationary rear portion and having an inwardly-extending flange matching with the flange thereof, a fastening device engaged with said flanges for the purpose specified, the rear deck-section also having an opening therein, and a removable closure for the opening.

In testimony whereof I have signed my name to this specification in the presence of two subscribing witnesses.

JAMES B. MOTT.

Witnesses:
H. J. PUTNAM,
F. A. PEMBERTON.